US006959080B2

(12) United States Patent
Dezonno et al.

(10) Patent No.: US 6,959,080 B2
(45) Date of Patent: Oct. 25, 2005

(54) METHOD SELECTING ACTIONS OR PHASES FOR AN AGENT BY ANALYZING CONVERSATION CONTENT AND EMOTIONAL INFLECTION

(75) Inventors: Anthony J. Dezonno, Bloomingdale, IL (US); Mark J. Power, Carol Stream, IL (US); Craig R. Shambaugh, Wheaton, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 10/259,359

(22) Filed: Sep. 27, 2002

(65) Prior Publication Data

US 2004/0062364 A1 Apr. 1, 2004

(51) Int. Cl.[7] .................................................. H04M 3/00

(52) U.S. Cl. .................. 379/265.07; 704/231; 704/270; 379/266.07

(58) Field of Search ........................... 379/266.2, 88.14, 379/88.13, 265.07, 88.01, 265.01, 266.07, 88.19; 704/231, 270; 709/202; 705/10; 706/231

(56) References Cited

U.S. PATENT DOCUMENTS 6,308,154 B1 * 10/2001 Williams et al. ............ 704/254
6,363,346 B1 * 3/2002 Walters ....................... 704/270
6,721,416 B1 * 4/2004 Farrell ................... 379/265.07
2002/0198707 A1 * 12/2002 Zhou .......................... 704/231
2003/0046181 A1 * 3/2003 Dow ........................... 705/26
2005/0086220 A1 * 4/2005 Coker et al. .................... 707/4

FOREIGN PATENT DOCUMENTS

GB 2 331 201 A 5/1999

* cited by examiner

*Primary Examiner*—Fan Tsang
*Assistant Examiner*—Olisa Anwah
(74) *Attorney, Agent, or Firm*—Welsh & Katz, Ltd.

(57) ABSTRACT

A method and apparatus are provided for accepting a call by an automatic call distributor and for automatic call handling of the call. The apparatus for automatic call handling has: a call receiving system that outputs at least one voice signal; a text voice converter having an input for the at least one voice signal, the text voice converter converting the voice signal to a text stream and providing the text stream on an output thereof; an emotion detector having an input for the at least one voice signal, the emotion detector detecting at least one emotional state in the voice signal and producing at least one tag indicator indicative thereof on an output of the emotion detector; and a scripting engine having inputs for the text stream and the at least one tag indicator, the scripting engine providing on an output thereof at least one response based on the text stream and on the at least one tag indicator. The method and apparatus provides the agents with scripts that are based on not only the content of the call from a caller, but that are also based upon the emotional state of the caller. As a result, there is a decrease in call duration, which decreases the cost of operating a call center. This decrease in the cost is a result in the amount of time an agent spends based on the agent's hourly rate and the costs associated with time usage of inbound phone lines or trunk lines.

27 Claims, 5 Drawing Sheets

METHOD SELECTING ACTIONS OR PHASES FOR AN AGENT BY ANALYZING CONVERSATION CONTENT AND EMOTIONAL INFLECTION

FIELD OF THE INVENTION

The field of the invention relates to telephone systems and, in particular, to automatic call distributors.

BACKGROUND

Automatic call distribution systems are known. Such systems are typically used, for example, within private branch telephone exchanges as a means of distributing telephone calls among a group of agents. While the automatic call distributor may be a separate part of a private branch telephone exchange, often the automatic call distributor is integrated into and is an indistinguishable part of the private branch telephone exchange.

Often an organization disseminates a single telephone number to its customers and to the pubic in general as a means of contacting the organization. As calls are directed to the organization from the public switch telephone network, the automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are software routines and algorithms that are operatively connected and/or part of the automatic call distributor.

A business desires to have a good relationship with its customers, and in the case of telemarketing, the business is interested in selling items to individuals who are called. It is appropriate and imperative that agents respond appropriately to customers. While some calls are informative and well focused, other calls are viewed as tedious and unwelcome by the person receiving the call. Often the perception of the telemarketer by the customer is based upon the skill and training of the telemarketer.

In order to maximize performance of telemarketers, telemarketing organizations usually require telemarketers to follow a predetermined format during presentations. A prepared script is usually given to each telemarketer and the telemarketer is encouraged to closely follow the script during each call.

Such scripts are usually based upon expected customer responses and typically follow a predictable story line. Usually, such scripts begin with the telemarketer identifying herself/himself and explaining the reasons for the call. The script will then continue with an explanation of a product and the reasons why consumers should purchase the product. Finally, the script may complete the presentation with an inquiry of whether the customer wants to purchase the product.

While such prepared scripts are sometimes effective, they are often ineffective when a customer asks unexpected questions or where the customer is in a hurry and wishes to complete the conversation as soon as possible. In these cases, the telemarketer will often not be able to respond appropriately when he must deviate from the script. Often a call, which could have resulted in a sale, will result in no sale, or more importantly, an irritated customer. Because of the importance of telemarketing, a need exists for a better method of preparing telemarketers for dealing with customers. In particular, there is a need for a means of preparing scripts for agents that take into account an emotional state of the customer or caller.

SUMMARY

One embodiment of the present system is a method and apparatus for accepting a call by an automatic call distributor and for automatic call handling of the call. The method includes the steps of receiving a voice signal, converting the voice signal to a text stream, detecting at least one emotional state in the voice signal and producing at least one tag indicator indicative thereof, and determining a response from the text stream and the at least one tag indicator. The apparatus for automatic call handling has: a call receiving system that outputs at least one voice signal; a voice-to-text converter having an input for the at least one voice signal, the voice-to-text converter converting the voice signal to a text stream and providing the text stream on an output thereof; an emotion detector having an input for the at least one voice signal, the emotion detector detecting at least one emotional state in the voice signal and producing at least one tag indicator indicative thereof on an output of the emotion detector; and a scripting engine having inputs for the text stream and the at least one tag indicator, the scripting engine providing on an output thereof at least one response based on the text stream and on the at least one tag indicator.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings in several figures of which like reference numerals identify like elements, and in which:

DETAILED DESCRIPTION

Figure 1:
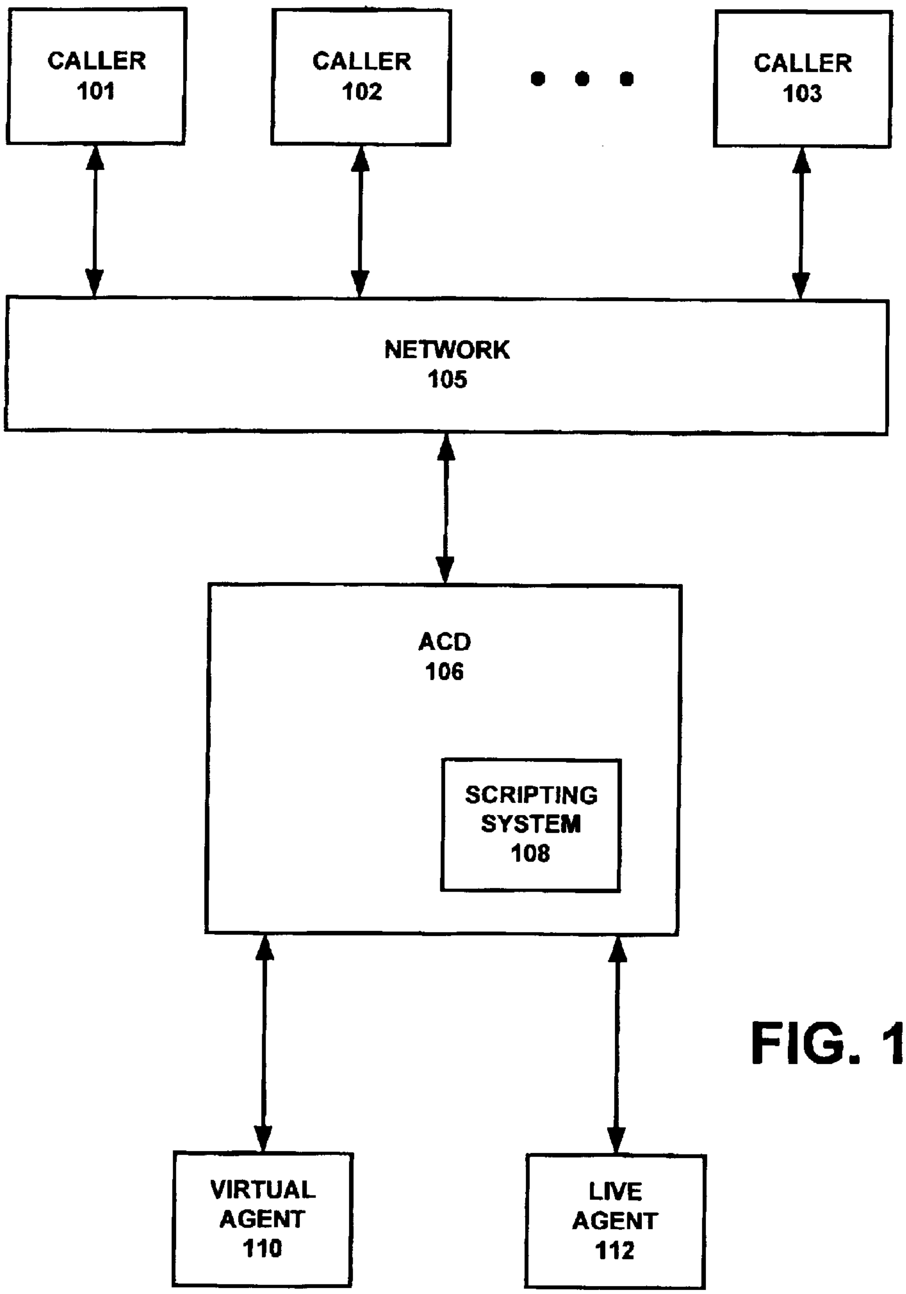
FIG. 1 is a block diagram depicting an embodiment of a system having an automatic call distributor.

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

FIG. 1 is a block diagram of an embodiment of a telephone system having an automatic call distributor 106 that contains a scripting system 108. Calls may be connected between callers 101, 102, 103 via network 105 to the automatic call distributor 106. The calls may then be distributed by the automatic call distributor 106 to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 106 may be a stand-alone unit, or may be integrated in a host computer, etc. The scripting system 108 may be implemented under any of number of different formats. For example, where implemented in connection with the public switch telephone network, the satellite network, the cellular or land mobile radio network, a script processor in the scripting system 108 would operate within a host computer associated with the automatic call distributor and receive voice information (such as pulse code modulation data) from a switched circuit connection which carries a voice between the callers 101, 102, 103 and the agents 110, 112.

Where the scripting system 108 is implemented in connection with the Internet, the scripting system 108 may operate from within a server. Voice information may be carried between the agents 110, 112 and callers 101, 102, 103 using packets. The scripting system 108 may monitor the voice of the agent and caller by monitoring the voice packets passing between the agent and caller.

Figure 2:
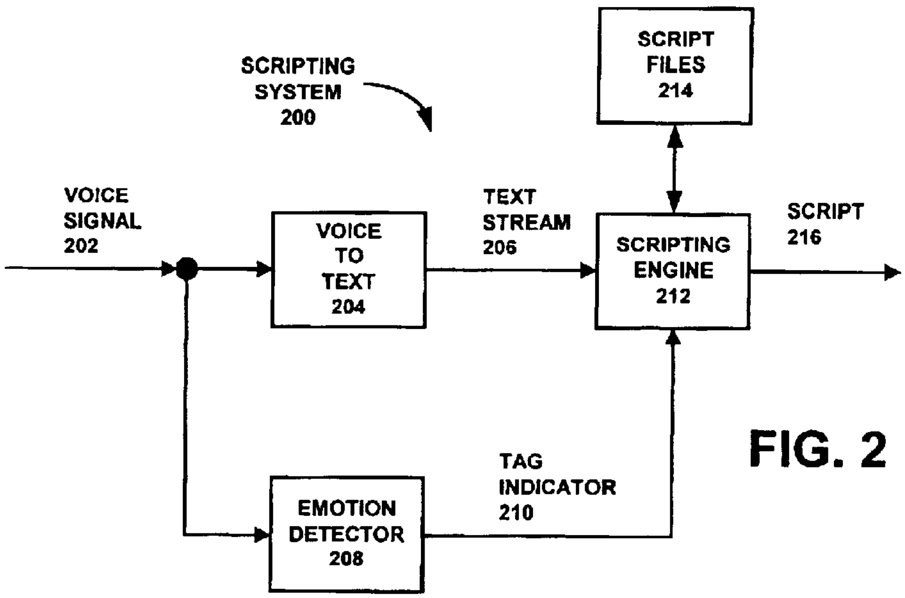
FIG. 2 is a block diagram depicting an embodiment of a scripting system used in the automatic call distributor of FIG. 2.

FIG. 2 is a block diagram of one embodiment of a scripting system 200 that may correspond to the scripting system 108 in the automatic call distributor 106 depicted in FIG. 1. The network receives a call from a caller, and provides to the scripting system 200 a transaction input, that is, voice signal 202. A voice to text module 204 converts the voice signal 202 to a text stream 206. Numerous systems and algorithms are known for voice to text conversion. Systems such as Dragon NaturallySpeaking 6.0 available from Scansoft Incorporated and AT&T Natural Voices™ Text-to-Speech Engine available from AT&T Corporation can function in the role of providing the translation from a voice stream to text data stream.

An emotion detector 208 also receives the voice signal 202. Within the emotion detector 208, the voice signal 202 is converted from an analog form to a digital form and is then processed. This processing may include recognition of the verbal content or, more specifically, of the speech elements (for example, phonemes, morphemes, words, sentences, etc.). It may also include the measurement and collection of verbal attributes relating to the use of recognized words or phonetic elements. The attribute of the spoken language may be a measure of the carrier content of the spoken language, such as tone, amplitude, etc. The measure of attributes may also include the measurement of any characteristic regarding the use of a speech element through which meaning of the speech may be further determined, such as dominant frequency, word or syllable rate, inflection, pauses, etc. One emotion detector, which may be utilized in the embodiment depicted in FIG. 2, is a system which utilizes a method of natural language communication using a mark-up language as disclosed in U.S. Pat. No. 6,308,154, hereby incorporated by reference. This patent is assigned to the same assignee as the present application. The emotion detector 208 outputs at least one tag indicator 310. Other outputs, such as, signals, data words or symbols, may also be utilized.

As detected in FIG. 2, the text stream 206 and the at least one tag indicator 210 are received by a scripting engine 212. Based upon the text stream 206 and the at least one tag indicator 210, the scripting engine 212 determines a response or script to the caller, that is, a response to the voice signal 202, and selects a script file from a plurality of script files 214. The script files 214 may be stored in a data base memory. The selected script is then output as script 216. This script 216 is then sent to an agent and guides the agent in replying to the current caller. The script 216 is based upon not only the text stream 206 derived from the voice signal 202 of the call, but is also based on the at least one tag indicator 210, which is an indication of the emotional state of the caller as derived from the current voice signal 202.

In an ongoing conversation, for example, a caller may be initially very upset and the scripting engine 212 therefore tailors the script file for output script 216 to appease the caller. If the caller then becomes less agitated as indicated by the emotion detector 208, via the tag indicator 210, the scripting engine 212 selects a different script file 214 and outputs it as script 216 to the respective agent. Thus, the agent is assisted in getting the caller to calm down and to be more receptive to a sale. Numerous other applications are envisioned whereby the agents are guided in responding to callers. For example, the automatic call distributor and scripting system may be used in a 911 emergency answering system, as well as in systems that provide account balances to customers, etc. As an example of one such embodiment, the emotion detector 208 may output a tag indicator 210 with a value identifying an emotional state and optionally an state value such as Aggravation Level=9. The scripting engine 212 will also receive a decoded text stream 206 associated with the Tag Indicator 210. A series of operational rules are used in the scripting engine 212 to calculate which script file 314 to select for the system based on tag values and text stream information. Script calculation is performed as a series of conditional logic statements that associate tag indicator 210 values with the selection of scripts. Each script contains a listing of next scripts along with the condition for choosing a particular next script. For example from script 1, script 2 may be chosen as the next script if tag indicator 210 values are less than 4, and script 3 may be selected for Tag indicator 210 values greater than 4 but less than 8, and script 4 may be selected for all other tag indicator values. More so, the selection of scripts may be also generated by the appearance of specific decoded word sequences such as the word "HELP" in a particular text stream. A multiplicity of tag indicator 210 and values for different emotional detector 208 generated tag may exist as input to the scripting engine 212. The script engine 212 will then load the script file and output the selected script 216.

Figure 3:
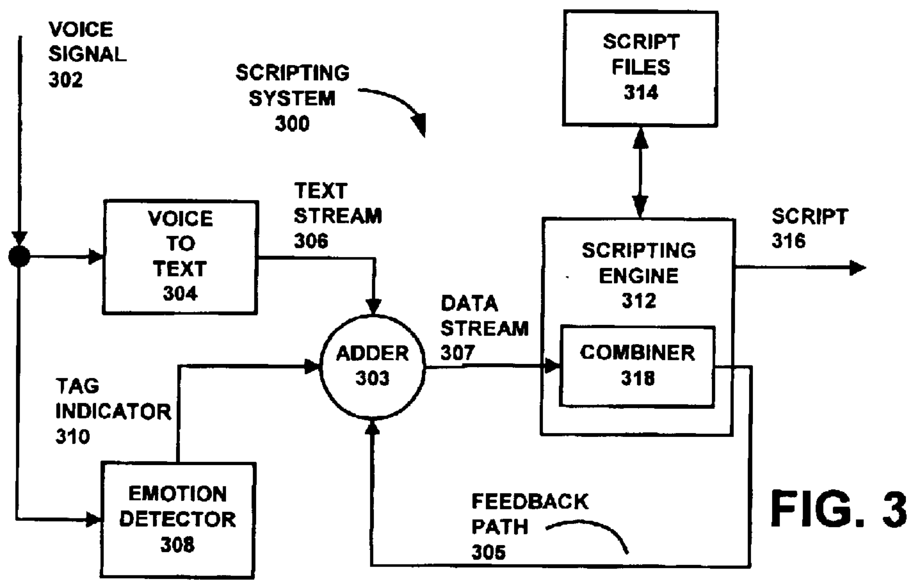
FIG. 3 is a block diagram depicting an alternative embodiment of the scripting system depicted in FIG. 1.

FIG. 3 is a block diagram of another embodiment of a scripting system 300. In this embodiment, an adder 303 receives the voice signal 302, which is derived from a caller, and also receives a data stream 307. The voice signal 302 and data stream 307 are combined and sent to the voice to text module 304, which converts the voice signal 302 to a text stream 306. An emotion detector 308 also receives the voice signal 302 and the data stream 307 and, as described above, detects the emotional state of the caller.

In the FIG. 3 embodiment, the text stream 306 and the tag indicator 310 are sent to the adder 303 where they are combined into the data stream 307 as input to a combiner module 318. The emotion detector 308 detects speech attributes in the voice signal 302 and then codes these using, for example, a standard mark-up language (for example, XML, SGML, etc.) and mark-up insert indicators. The text stream 306 may consist of recognized words from the voice signal 302 and the tag indicators 310 may be encoded as a composite of text and attributes to the adder module 303. In the preferred embodiment, the adder module 303 forms a composite data stream 307 by combining the tag indicator 310 and text stream together and subtracts a value from the feedback path 305 to create the resulting data stream 307 to the combiner 318. In another embodiment, the feedback path 305 calculated by the combiner 318 may limit the maximum change in a sampling period of the emotion detector 308 components to adjust for rapidly changing emotional responses. The data stream 307 from the adder module 303 may be formed from the text stream 306 and the tag indicators 310 according to the method described in U.S. Pat. No. 6,308,154. As can be seen from FIG. 3, the combiner 318 in the scripting engine 312 provides the data stream 307 to the adder 303 along a feedback path 305. This creates a feedback loop in the system, which provides for system stability and assists in tracking changes in the emotional state of the caller during an ongoing call. During the call, the scripting engine 312 selects script files 314 which are appropriate to the current emotional state of the caller and provides script 316 to the agent for guiding the agent in responding to the caller.

Figure 4:
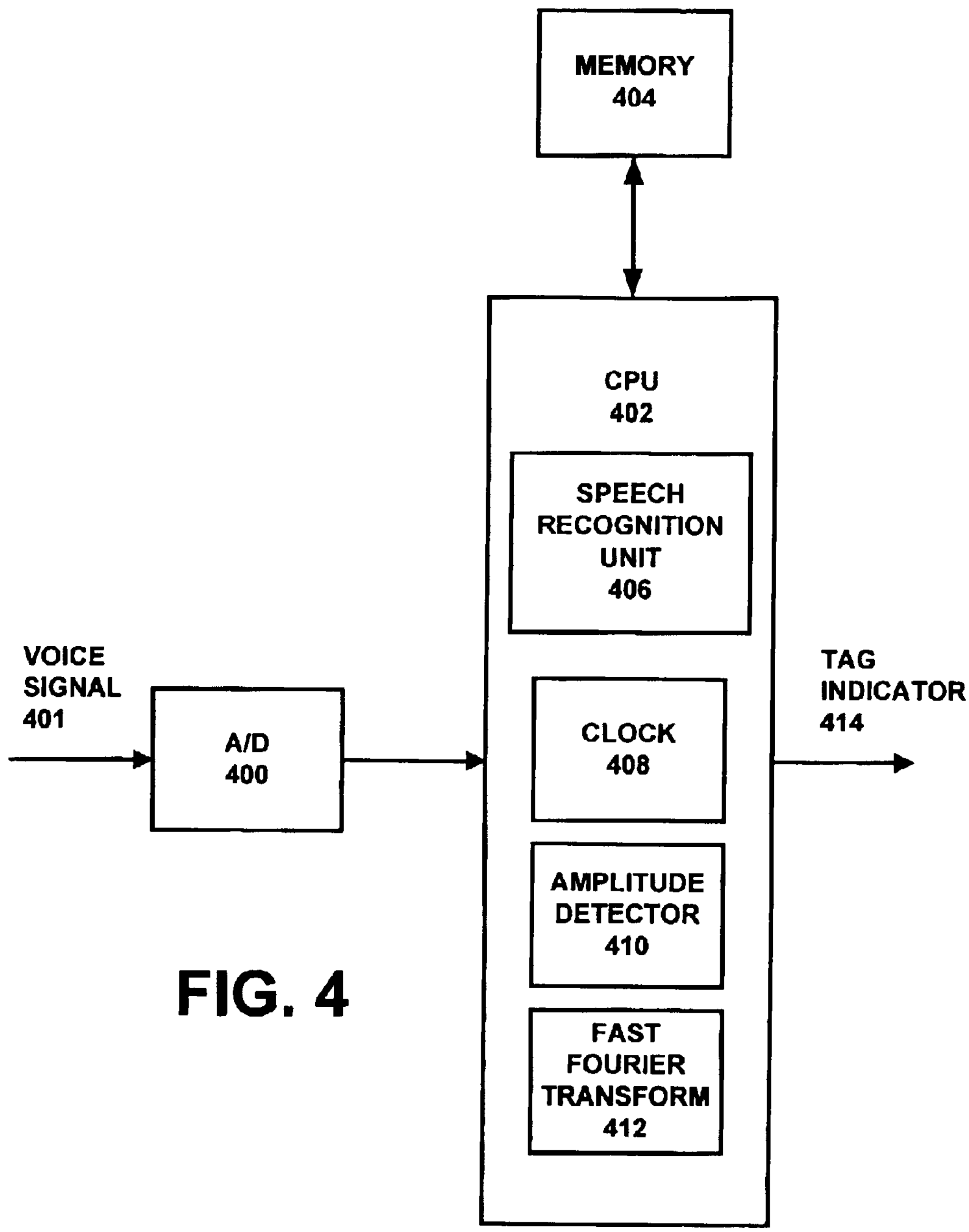
FIG. 4 is a block diagram of an embodiment of an emotion detector used in the scripting system.

FIG. 4 is a more detailed block diagram of an embodiment of the emotion detector. As depicted in FIG. 4, a voice signal 401 is received by an analog to digital converter 400 and converted into a digital signal that is processed by a central processing unit (CPU 402). The CPU 402 may have a speech recognition unit 406, a clock 408, an amplitude detector 410, or a fast fourier transform module 412. The CPU 402 is typically operatively connected to a memory 404 and outputs a tag indicator 414. The speech recognition unit 406 may function to identify individual words, as well as recognizing phonetic elements. The clock 408 may be used to provide markers (for example, SMPTE tags for time sync information) that may thereafter be inserted between recognized words or inserted into pauses. An amplitude detector 410 may be provided to measure the volume of speech elements in the voice signal 401. The fast fourier transform 412 may be utilized to process the speech elements using a fast fourier transform application which provides one or more transform values. The fast fourier transform application provides a spectral profile that may be provided for each word. From the spectral profile a dominant frequency or profile of the spectral content of each word or speech element may be provided as a speech attribute.

Figure 5:
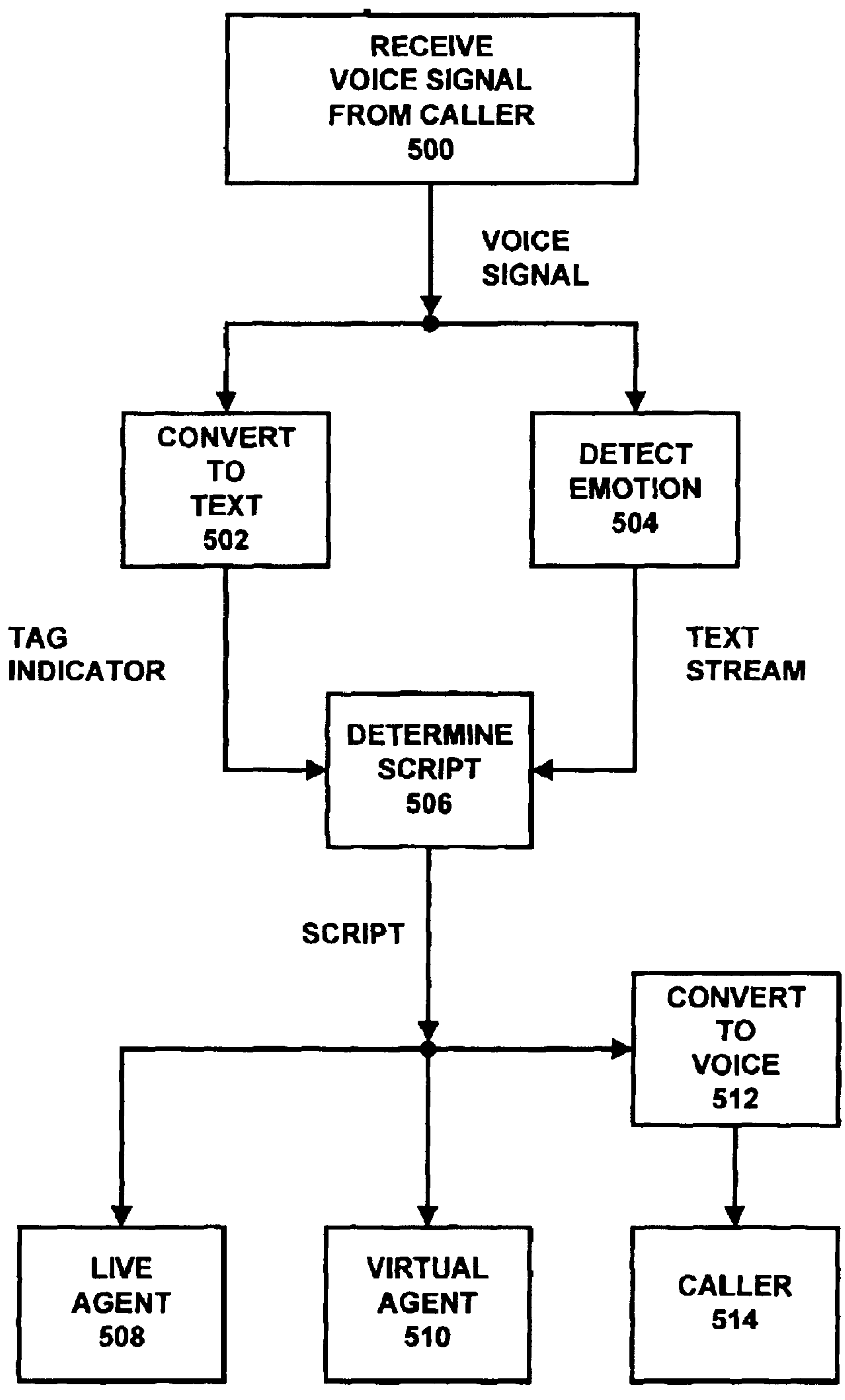
FIG. 5 is a flow diagram depicting an embodiment of the determination of a script based upon the detected emotion of a received voice of the caller.

FIG. 5 is a flow diagram depicting an embodiment of a method of automatic call handling. Initially a voice signal is received from a caller in a step 500. This voice signal is then converted to text at step 502, and concurrently the emotion of the caller is detected at step 504 from the voice signal. From step 502 a text stream is output and from step 504 the tag indicators are output, and in step 506 an appropriate script is determined based on the text stream and tag indicators. After an appropriate script is determined at step 506, it is forwarded to a live agent 508, a virtual agent 510, or a caller 514 via a text-to-voice process 512. As explained above, an appropriate script is provided to the agents for more efficient call handling and, possibly, a sale of a product. The determination of scripts based upon the emotional state of the caller can be extremely important where the system does not involve a live agent and the script is converted to voice in step 512 and presented directly to the caller 514. By selecting a script as a function of the emotional state of the caller, a virtual agent 510 can be much more effective in providing more reasonable answers to questions put forth by the caller.

Figure 6:
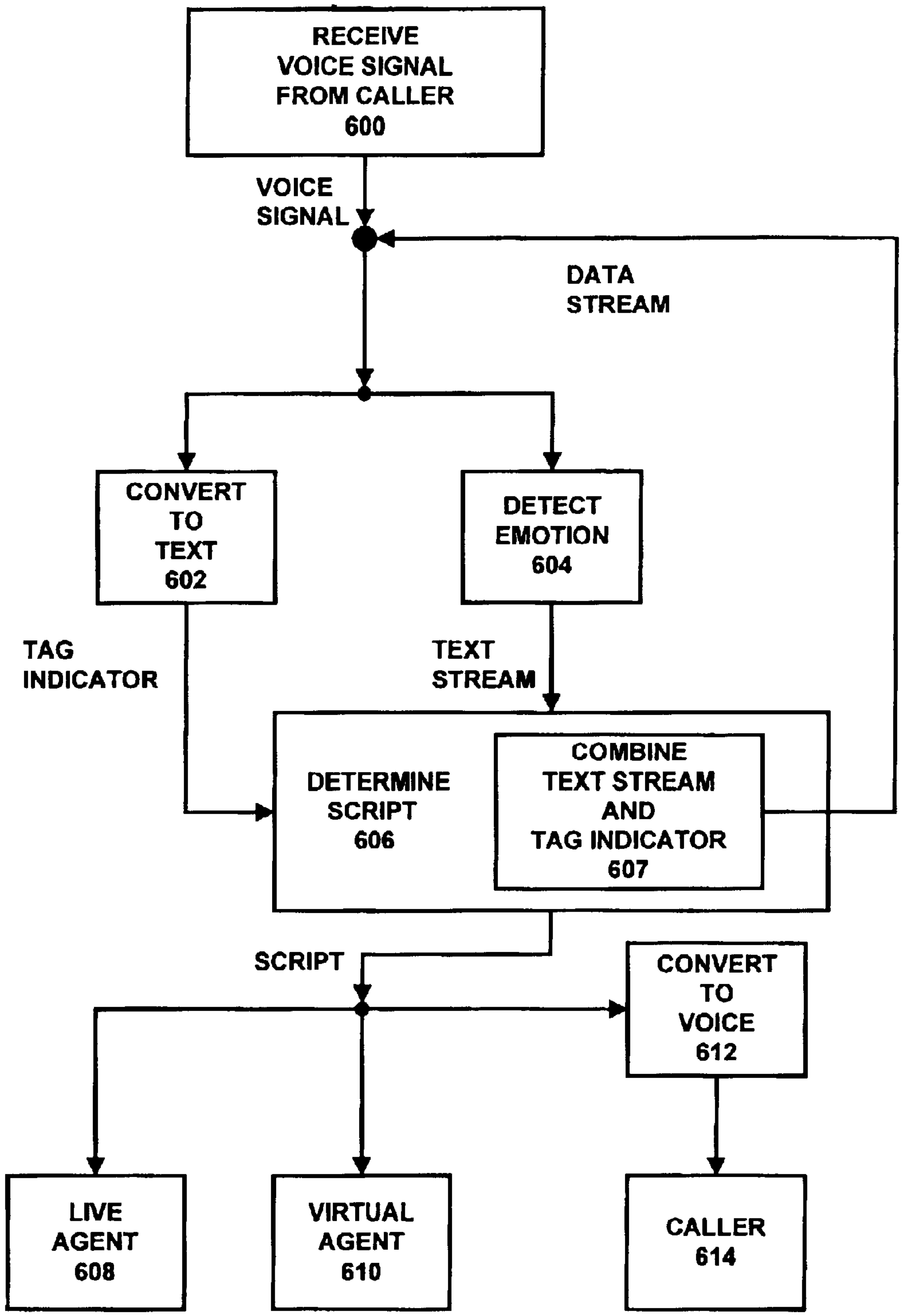
FIG. 6 is a block diagram depicting another embodiment of the steps of determining a script from a voice signal of a caller.

FIG. 6 is another embodiment of the processing of calls that takes into consideration the emotional state of the caller and begins with the first step 600 where the voice signal is received from the caller. This voice signal is presented along with the data stream to the conversion of voice to text in step 602 and concurrently to the detection of emotion in step 604. The text stream from the step of converting the voice to text in step 602 and the tag indicators from the step of detecting the emotion in step 604 are provided for determining an appropriate script at step 606. This also includes a step 607 of combining the text stream and the tag indicators to provide the data stream. Scripts from the step 606 are then provided to live agents 608, virtual agents 610, and/or callers 614 via a conversion of text to voice in step 612.

The above-described system overcomes the drawbacks of the prior art and provides the agents with scripts that are based on not only the content of the call from a caller, but are also based upon the emotional state of the caller. As a result, there is a decrease in call duration, which decreases the cost of operating a call center. This decrease in the cost is a direct result in the amount of time an agent spends based on the agent's hourly rate and the costs associated with time usage of inbound phone lines or trunk lines. Thus, the above-described system is more efficient than prior art call distribution systems. The above-described system is more than just simply a call distribution system, but is a system that increases the agent's ability to interface with a caller.

The invention is not limited to the particular details of the apparatus depicted, and other modifications and applications are contemplated. Certain other changes may be made in the above-described apparatus without departing from the true spirit and scope of the invention herein involved. It is intended, therefore, that the subject matter in the above depiction shall be interpreted as illustrative and not in a limiting sense.

What is claimed is:

1. A method of automatic call handling using a plurality of previously prepared scripts that follow a predetermined format and a predetermined story line during presentation, such method comprising:

receiving a voice signal;

converting the voice signal to a text stream;

detecting at least one emotional state in the voice signal and producing at least one tag signal indicative thereof;

determining a response under the predetermined format and predetermined story line from the text stream and the at least one tag indicator, said determined response further comprising a script of the plurality of previously prepared scripts wherein each script of the plurality of scripts contains a listing of next scripts along with a condition for selecting a particular next script and wherein the determining step further comprises determining the next script by matching the condition of one of the plurality of scripts with a content of the text stream and at least one tag indicator.

2. The method of automatic call handling according to claim 1, wherein the method further comprises combining the test stream and the at least one tag indicator into a data stream, and thereafter determining a response from the data stream.

3. The method of automatic call handling according to claim 2, wherein the method further comprises feeding back the data stream, and converting the data stream to a text stream and detecting at least one emotional state in the data stream.

4. The method of automatic call handling according to claim 1, wherein the steps of converting and detecting are performed concurrently.

5. The method of automatic call handling according to claim 2, wherein the response is at least one script of a plurality of scripts.

6. The method of automatic call handling according to claim 5, wherein the voice signal is received from a caller, wherein the scripts are stored in test formats, and wherein the at least one script is converted from text to voice, and thereafter forwarded to the caller.

7. An apparatus for automatic call handling using a plurality of previously prepared scripts that follow a predetermined format and a predetermined story line during presentation, the apparatus comprising:

means for receiving a voice signal;

means for converting the voice signal to a text stream;

means for detecting at least one emotional state in the voice signal and producing at least one tag signal indicative thereof; and means for determining a response under the predetermined format and the predetermined story line from the text stream and the at least one tag indicator said determined response further comprising a script of the plurality of previously prepared scripts wherein each script of the plurality of scripts contains a listing of next scripts along with a condition for selecting a particular next script and wherein the determining step further comprises determining the next script by matching the condition of one of the plurality of scripts with a content of the text stream and at least one tag indicator.

8. The apparatus for automatic call handling according to claim 7, wherein the apparatus further comprises means for combining the test stream and the at least one tag indicator into a data stream, a response being determined from the data stream.

9. The apparatus for call handling according to claim 8, wherein the apparatus further comprises means for feeding back the data stream to the means for converting the data stream to a text stream and to the means for detecting at least one emotional state in the data stream.

10. The apparatus for automatic call handling according to claim 7, wherein the response is at least one script of a plurality of scripts.

11. The apparatus for automatic call handling according to claim 10, wherein the voice signal is received from a caller, wherein the scripts are stored in text formats, and wherein the apparatus further comprises means for converting the at least one script from text to voice, which is forwarded to the caller.

12. An apparatus for automatic call handling using a plurality of previously prepared scripts that follow a predetermined format and a predetermined story line during presentation, the apparatus comprising:

call receiving system that outputs at least one voice signal;

text to voice converter having an input for the at least one voice signal, the text to voice converter converting the voice signal to a text stream and providing the text stream on an output thereof;

emotion detector having an input of the at least one voice signal, the emotion detector detecting at least one emotional state in the voice signal and producing at least one tag signal indicative thereof on an output thereof; and scripting engine having inputs for the text stream and the at least one tag indicator, the scripting engine providing on an output thereof at least one response based on the text stream, the predetermined story line and the at least one tag said scripting engine further comprising the plurality of previously prepared scripts wherein each script of the plurality of scripts contains a listing of next scripts along with a condition for selecting a particular next script and wherein the provided response further comprises the next script determined by matching the condition of one of the plurality of scripts with a content of the text stream and at least one tag indicator.

13. The apparatus for automatic call handling according to claim 12, wherein the apparatus further comprises a combiner for combining the text stream and the at least one tag indicator into a data stream, a response being determined from the data stream.

14. The apparatus for automatic call handling according to claim 13, wherein the apparatus further comprises a feed back path for feeding back the data stream to the voice to text converter and to the emotion detector.

15. The apparatus for automatic call handling according to claim 12, wherein the response is at least one script of a plurality of scripts.

16. The apparatus for automatic call handling according to claim 12, wherein the voice signal is received from a caller, wherein the scripts are stored in text formats, and wherein the apparatus further comprises a test to voice converter that converts the at least one script from text to voice, which is forwarded to the caller.

17. A computer program product embedded in a computer readable medium allowing agent response using a plurality of previously prepared scripts that follow a predetermined format and a predetermined story line to an emotional state of caller in an automatic call distributor, comprising:

a computer readable media containing code segments comprising:

a combining computer program code segment that receives a voice signal;

a combining computer program code segment that converts the voice signal to a text stream;

a combining computer program code segment that detects at least one emotional state in the voice signal and produces at least one tag signal indicative thereof; and a combining computer program code segment that determines a response under the predetermined format and the predetermined story line from the text stream and the at least one tag indicator, said determined response further comprising a script of the plurality of previously prepared scripts wherein each script of the plurality of scripts contains a listing of next scripts along with a condition for selecting a particular next script and wherein the determination of the next script further comprises determining the next script by matching the condition of one of the plurality of previously prepared scripts with a content of the text stream and at least one tag indicator.

18. The method of automatic call handling according to claim 17, wherein the response is at least one script of a plurality of scripts.

19. A method of automatic call handling using a plurality of previously prepared scripts that follow a predetermined format and a predetermined story line during presentation, the method comprising:

receiving a call having a voice signal;

combining the voice signal with a feedback signal to produce a combined signal;

converting the combined signal to a text stream;

detecting predetermined parameters in the combined signal and producing at least one tag indicator signal indicative thereof; and embedding the at least one tag indicator in the text stream, and determining a response under the predetermined format and the story line from the text stream and the tag indicator, the text stream with embedded tag indicator being utilized as the feedback signal, said determined response further comprising a script of the plurality of previously prepared scripts wherein each script of the plurality of scripts contains a listing of next scripts along with a condition for selecting a particular next script and wherein the determining step further comprises determining the next script by matching the condition of one of the plurality of previously prepared scripts with a content of the text stream and at least one tag indicator.

20. The method of automatic call handling according to claim 19, wherein the response is at least one script of a plurality of scripts.

21. The method of automatic call handling according to claim 20, wherein the scripts are stored in text formats, and wherein the at least one script is converted from text to voice, and thereafter forwarded to the caller.

22. A method of automatic call handling using a plurality of previously prepared scripts that follow a predetermined format and a predetermined story line during presentation, the method comprising:

receiving a call from a caller, the call having a plurality of segments, each of the segments having at least a voice signal;

analyzing, for each segment, audio information in a respective voice signal for determining a current emotional state of the caller and forming at least one tag indicator indicative of the current emotional state of the caller; converting the respective voice signal of the call to a text stream; and determining a current course of action from the text stream and the at least one tag indicator, said determined course of action further comprising selecting a script of the plurality of previously prepared scripts that follows the predetermined story line wherein each script of the plurality of scripts contains a listing of next scripts along with a condition for selecting a particular next script and wherein the determining step further comprises determining the next script by matching the condition of one of the plurality of previously prepared scripts with a content of the text stream and at least one tag indicator.

23. The method of automatic call handling according to claim 22, wherein the course of action is at least one script of a plurality of scripts.

24. The method of automatic call handling according to claim 23, wherein the scripts are stored in text formats, and wherein the at least on script is converted from text to voice, and thereafter forwarded to the caller.

25. A method of automatic call handling allowing agent response to emotional state of caller in an automatic call distributor using a plurality of previously prepared scripts that follow a predetermined format and a predetermined story line, the method comprising:

receiving a call from a caller;

analyzing audio information in the call for determining an emotional state of the caller and forming a tag indicative of the emotional state of the caller;

converting a voice signal of the call to a text stream;

scripting a response based on the text stream and the tag;

embedding the tag in the text stream and outputting a feedback signal composed of the text stream with the embedded tag;

combining the feedback signal with the voice signal; and providing the response to the caller, wherein said provided response further comprising a script of the plurality of previously prepared scripts that follows the predetermined story line, wherein each script of the plurality of scripts contains a listing of next scripts along with a condition for selecting a particular next script and wherein the scripting step further comprises determining the next script by matching the condition of one of the plurality of previously prepared scripts with a content of the text stream and at least one tag indicator.

26. The method of automatic call handling according to claim 25, wherein the response is at least one script of a plurality of scripts.

27. The method of automatic call handling according to claim 26, wherein the scripts are stored in text formats, and wherein the at least one script is converted from text to voice, and thereafter forwarded to the caller.

* * * * *